INVENTOR
EDWARD H. McCLOUD.
BY
ATTORNEYS

March 8, 1938. E. H. McCLOUD 2,110,231
CLOSURE OPERATING DEVICE
Filed July 28, 193- 8 Sheets-Sheet 3
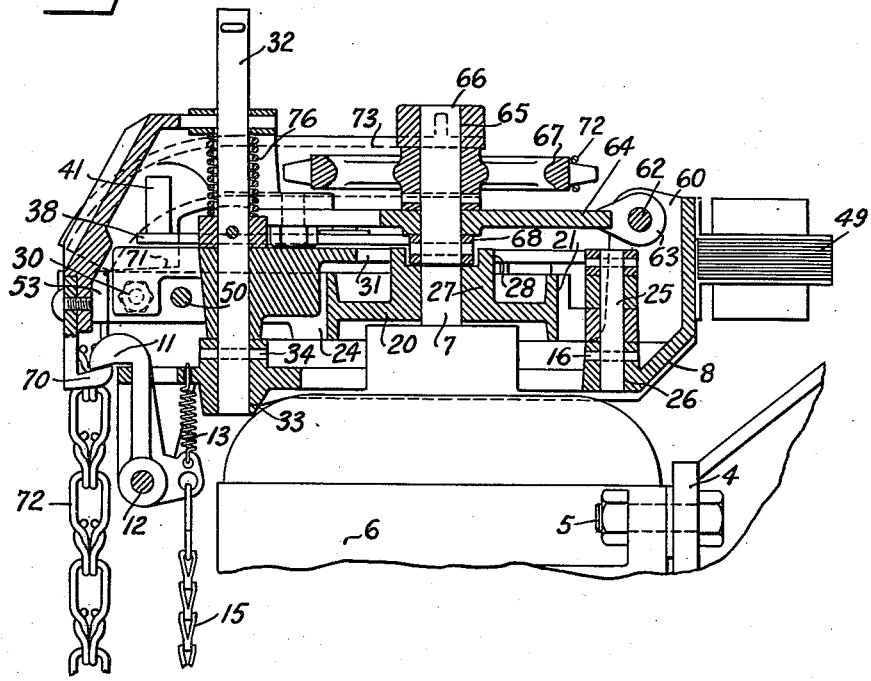
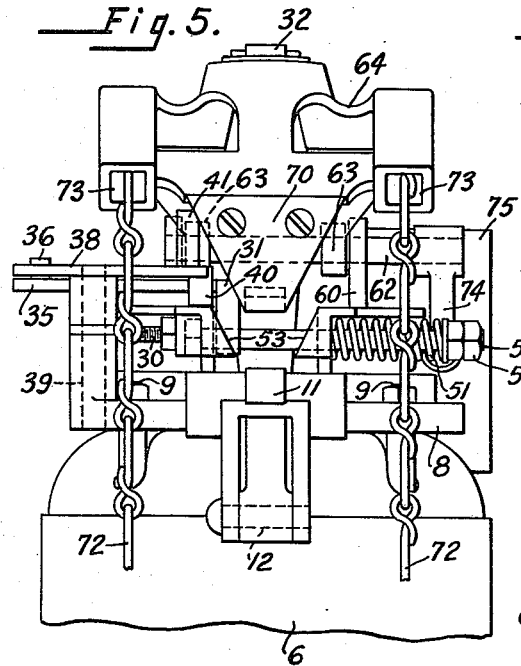
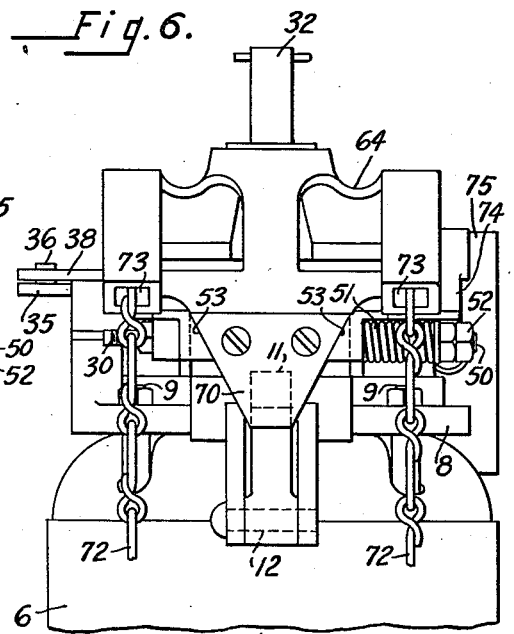
INVENTOR
EDWARD H. McCLOUD.
BY
ATTORNEYS

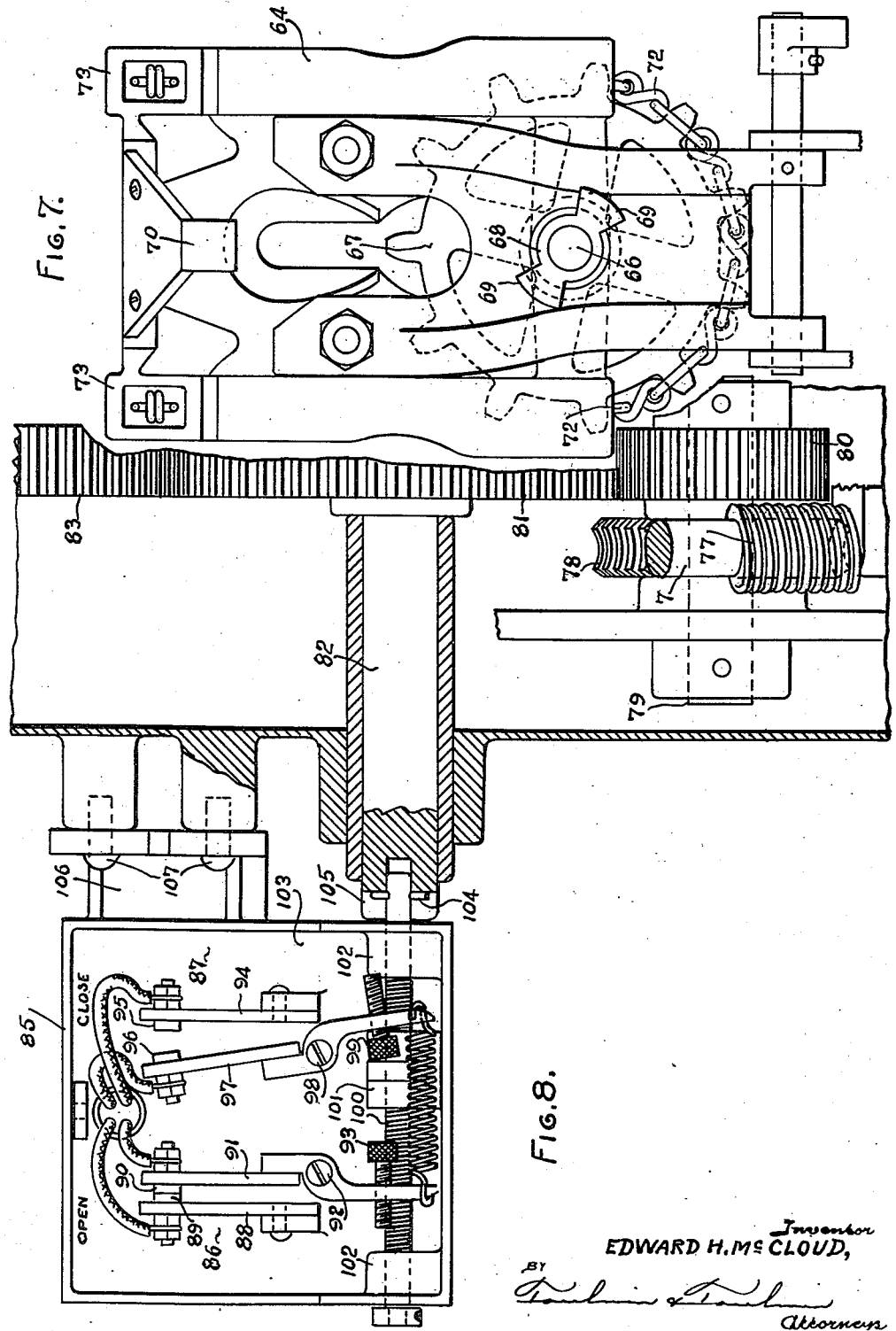

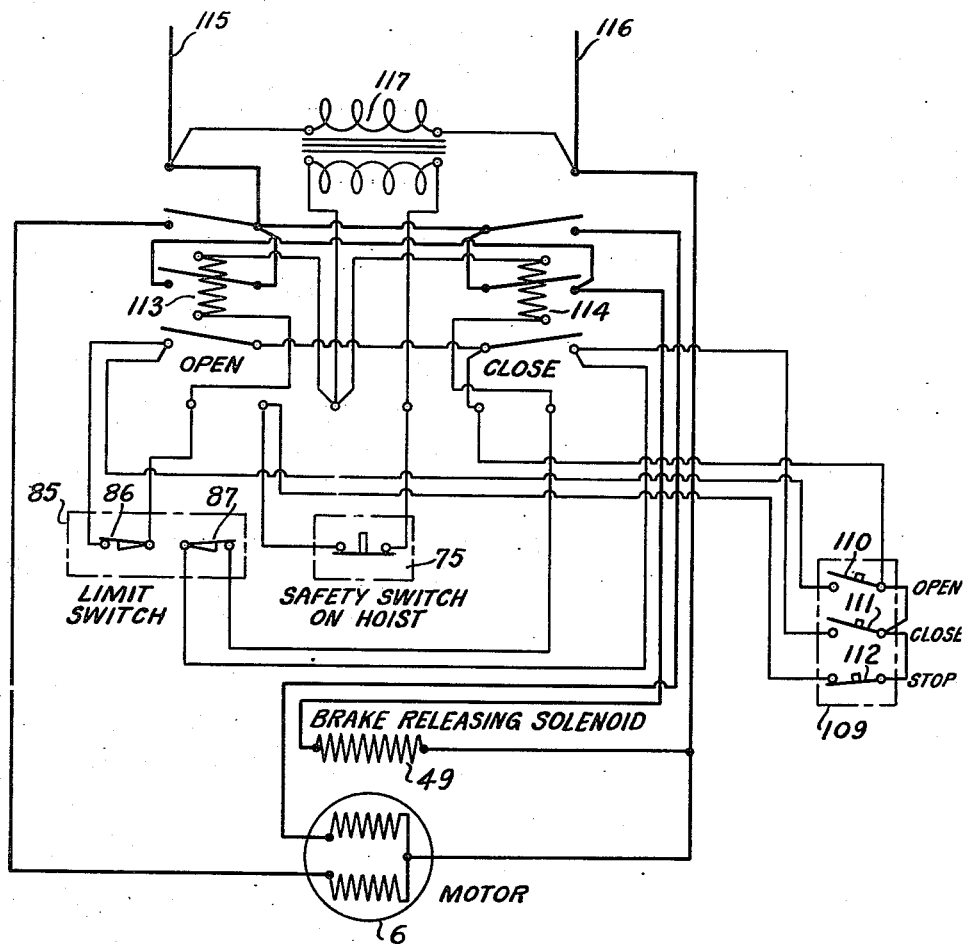

March 8, 1938.  E. H. McCLOUD  2,110,231
CLOSURE OPERATING DEVICE
Filed July 28, 1934    8 Sheets-Sheet 6
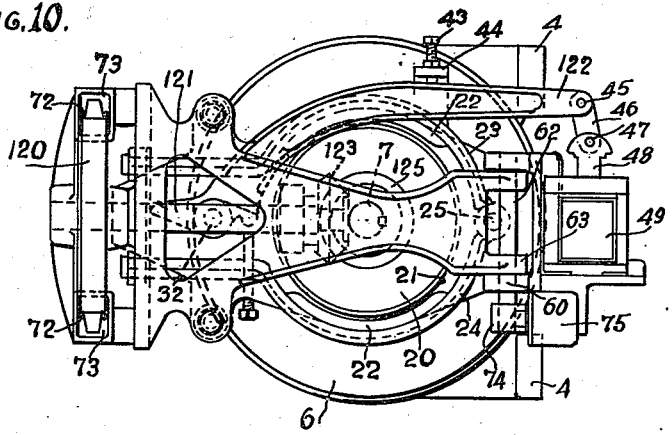
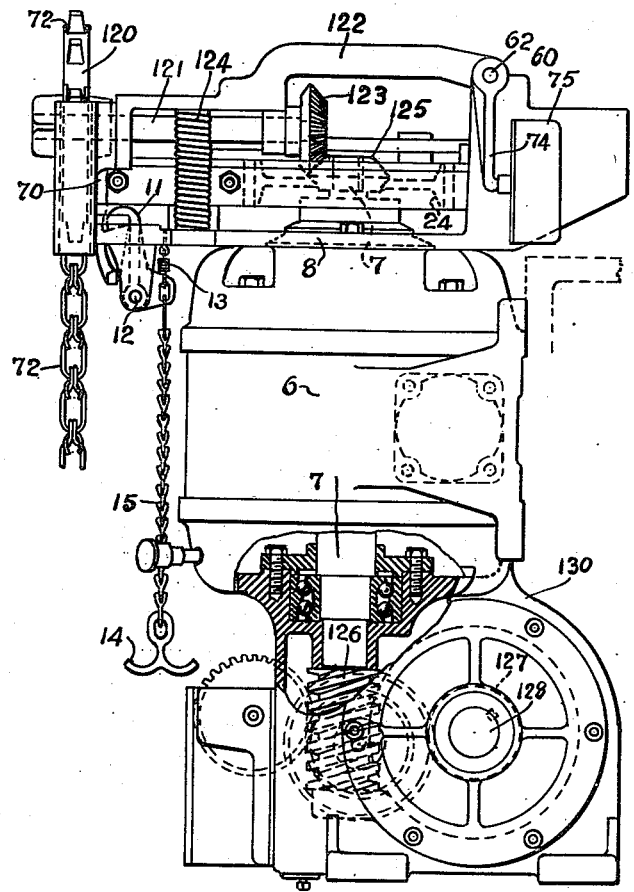
Inventor
EDWARD H. McCLOUD,
Attorneys March 8, 1938.　　　　E. H. McCLOUD　　　　2,110,231
CLOSURE OPERATING DEVICE
Filed July 28, 1934　　　　8 Sheets-Sheet 7

EDWARD H. McCLOUD, *Inventor*

Patented Mar. 8, 1938

2,110,231

UNITED STATES PATENT OFFICE 2,110,231

CLOSURE-OPERATING DEVICE

Edward H. McCloud, Columbus, Ohio, assignor, by mesne assignments, to General Door Company, Reno, Nev., a corporation of Nevada Application July 28, 1934, Serial No. 737,395

6 Claims. (Cl. 268—60)

This invention relates to devices for operating closures and, in particular, to devices used in opening and closing doors.

One object of this invention is to provide a closure-operating device which may be actuated either manually or by power, the device having means for rendering one type of actuation inoperative while the other is being used.

Another object is to provide a closure-operating device which is normally power-operated but which may be operated, if desired, by hand, the device having mechanism for disengaging the manual portion of the apparatus while the power-driven portion is being operated, such as by providing means for preventing the engagement of the manually-operated mechanism.

Another object is to provide a closure-operating device driven by a motor and having provision for manual actuation, the device being provided with means for rendering the motor inoperative, such as by a mechanically-tripped throw-out switch, when the manually-operated mechanism is engaged.

Another object is to provide a closure-operating device having a brake which is automatically released when the device is actuated, either manually or by power.

Another object is to provide a closure-operating device wherein a limit switch is actuated by mechanism operatively connected to the driving mechanism, and adjusted so that the switch will be thrown when the door or other closure reaches either or both limits of its motion.

In the drawings:

Figure 4 is a central vertical section through that portion of the apparatus shown in Figure 2, with the mechanism for manual operation engaged.

Figure 5 is a front elevation of the mechanism shown in Figure 4, but with the mechanism for manual operation disengaged.

Figure 6 is a front elevation of the apparatus shown in Figure 5, but with the parts engaged for manual operation.

Figure 7 is a bottom plan view of the hinged top portion of the apparatus shown in Figure 4.

Figure 8 is a bottom plan view of the limit switch for rendering the motor circuit inoperative when the closure reaches its closed or opened positions.

Figure 9 is a wiring diagram of the electrical circuit utilized in actuating the closure-operating device of my invention.

Figure 10 is a top plan view of the upper portion of a modified form of the closure-operating device of my invention.

Figure 11 is a righthand side elevation of the modified device shown in Figure 10.

Figure 1:
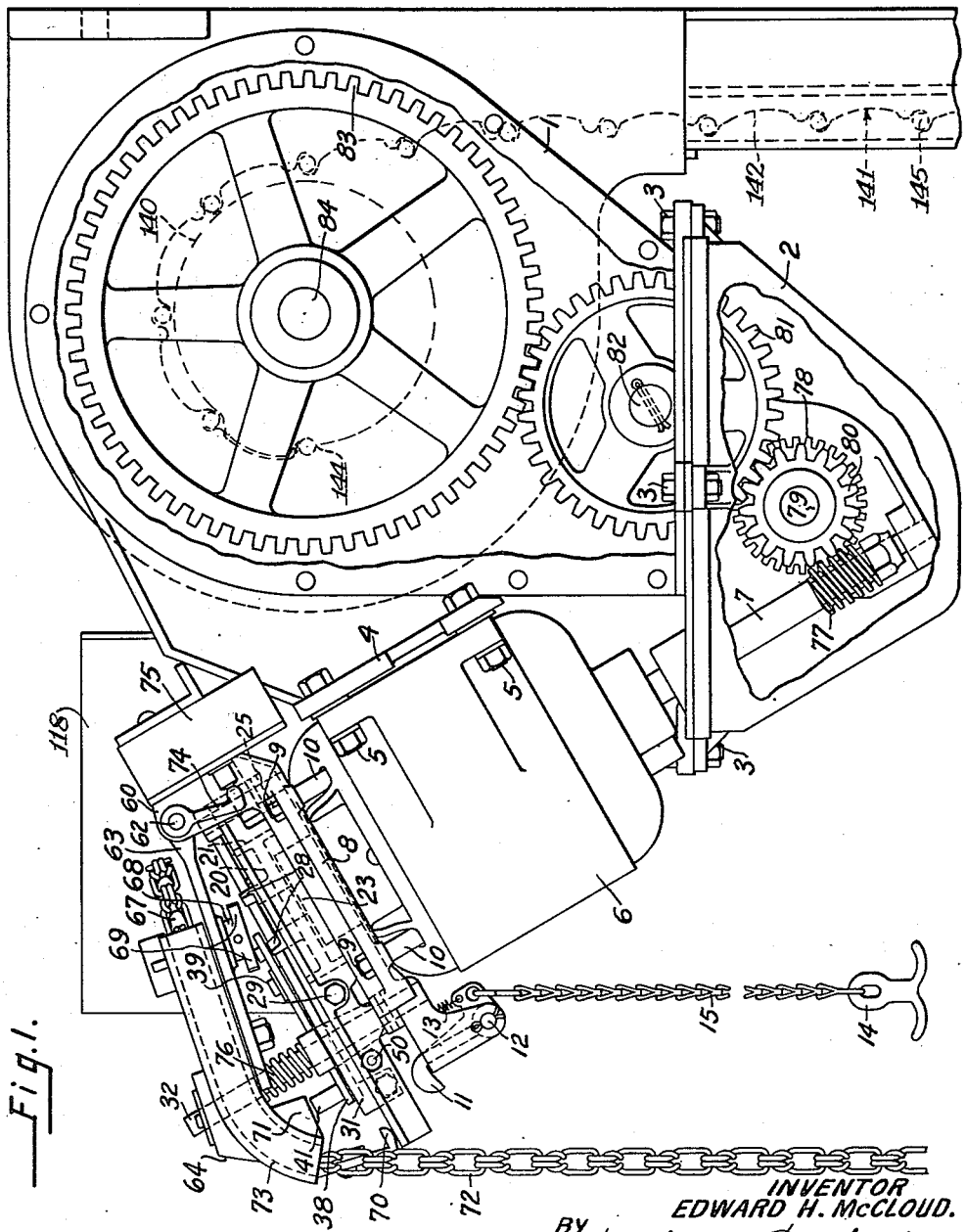
Figure 1 is a righthand side elevation, partly broken away, of the closure-operating device of my invention in a preferred form of embodiment.

Referring to the drawings in detail, Figure 1 shows a preferred embodiment of the closure-operating device of my invention as having a casing 1 containing various mechanism hereinafter described, and having a sump casing 2 attached to the bottom portion thereof, as by the bolts 3. This latter portion contains lubricant for the various gearing hereinafter described.

Attached to the casing 1, as by the bracket 4 and the bolts 5, is a motor 6 serving to operate the various moving parts, and having a drive shaft 7. The motor 6 is of the single-phase three-wire type (Figure 9). Mounted upon the upper end of the motor 6, which is in an oblique position, is the base plate 8, the latter being held in place by the nuts 9 on the threaded studs 10. The base plate 8 at its forward end carries a latch member 11 of bell crank form and pivotally mounted upon the pin 12. The latch member 11 is urged in one direction by the coil spring 13 attached to one portion thereof, and may be moved in the opposite direction by the handle 14 and the operating chain 15.

Figure 3:
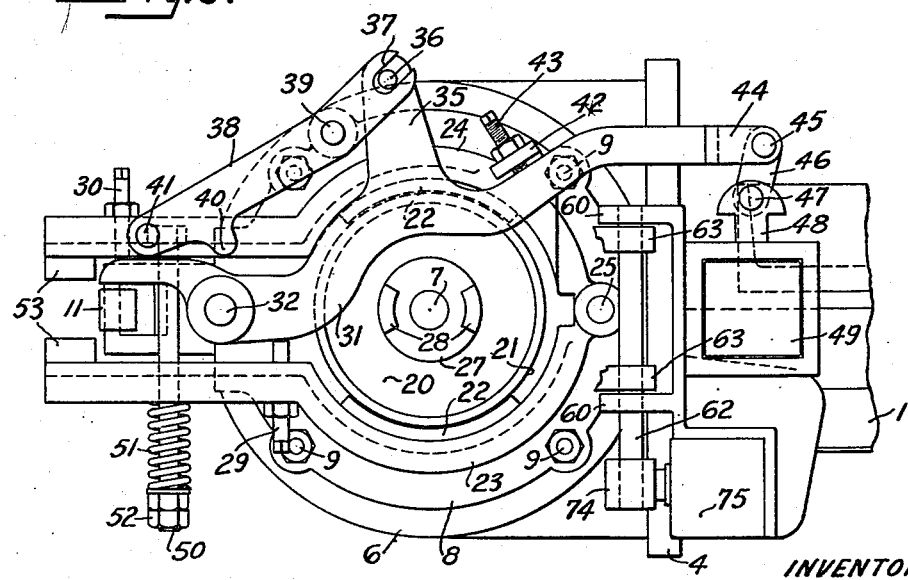
Figure 3 is a top plan view of the mechanism shown in Figure 2, but with the hinged upper portion thereof removed.

Firmly secured to the motor shaft 7 is the brake drum 20 having the brake surface 21, on which the brake bands 22 are adapted to operate. The latter are mounted on the brake arms 23 and 24, these being pivotally mounted upon the upstanding shaft 25 secured in the bore 26 of the base plate 8, as by the pin 16 (Figures 3 and 4). The brake drum 20 is provided with a clutch portion 27 having clutch jaws 28 operated manually in a manner subsequently to be described.

The brake arms 23 and 24 are provided with adjusting screws 29 and 30 respectively adapted to engage opposite sides of the brake-operating lever 31 (Figure 3), the latter being mounted upon the upstanding shaft 32 secured within the bore 33 of the base plate 8, as by the pin 34.

The brake-operating lever 31 is provided with an extension arm 35 projecting therefrom and carrying the pin 36, engaging the slotted portion 37 of the bent lever 38. The latter is pivotally mounted upon the upstanding pin 39 and is provided with a downwardly projecting boss 40 and an upwardly projecting boss 41. The boss 40 engages the upper surface of the brake arm 24, whereas the boss 41 serves as a movable stop for preventing engagement of the upper hinged portion of the apparatus, as described below. The brake member 24 is provided with an upwardly-projecting arm 42 having an adjusting screw 43 adapted to engage the brake-operating arm 31 and to thereby limit its motion (Figures 3 and 4).

One end of the brake-operating arm 31 is provided with a yoke portion 44, carrying the pin 45 which pivotally carries the connecting rod 46. The opposite end of the latter is pivotally mounted upon the pin 47 attached to the armature 48 of the solenoid 49. This solenoid is connected in the motor circuit in a manner hereinafter described and in such a way as to be energized while the motor is operating. This energization attracts the armature 48 and shifts the brake-operating arm 31 (Figure 3), thereby causing portions thereof near the shaft 32 to engage the ends of the adjusting screws 29 and 30, thereby separating the brake arms 23 and 24. This withdraws the brake bands 22 from engagement with the brake surface 21 of the brake drum 20, and allows the mechanism to rotate freely. At the same time, the motion of the arm 35 on the brake arm 31 moves the upstanding boss 41 into such a position beneath the upper hinged part of the apparatus that the latter cannot be forced downward into its engaged position.

The brake arm 24 is provided with a stud bolt 50, the opposite end of which passes loosely through the brake arm 23, its outer end carrying the coil spring 51 held in place by the lock nuts 52. The opposite end of the coil spring 51 bears against the brake arm 23 and urges the latter toward the brake arm 24. The outer ends of the arms 23 and 24 are provided with the beveled portions 53, the purpose of which will be immediately apparent.

Figure 2:
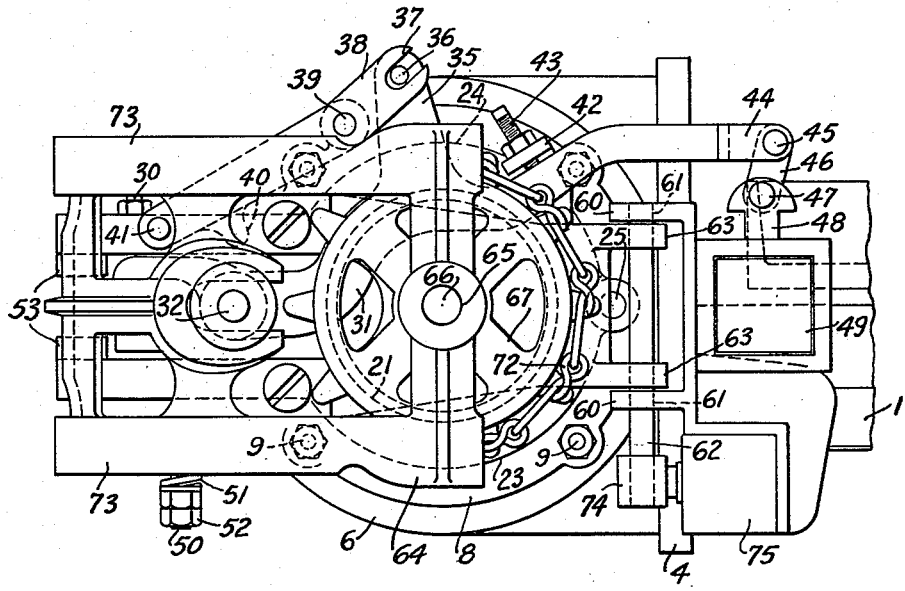
Figure 2 is a top plan view of the upper lefthand portion of the mechanism shown in Figure 1.

The base plate 8 on the side opposite the arm carrying the pin 12 is provided with upwardly projecting bosses 60, having bores 61 serving as bearings to rotatably support the horizontal shaft 62 (Figures 2 and 4). The shaft 62 is fixedly secured in the bosses 63 forming a part of the hinged supporting member 64. The latter is provided with a bore 65, in which is fixed the shaft 66 rotatably supporting the sprocket 67 on the underside of the hinged support 64 (Figures 2 and 7). The underside of the sprocket 67 is provided with a clutch portion 68 (Figures 4 and 7), having teeth 69 adapted to engage the spaces between the teeth 28 of the clutch portion 27 mounted on the motor shaft 7 (Figure 3). This engagement, however, takes place only when the hinged support 64 is moved downward until its latch-engaging portion 70 on the front thereof (Figure 4) is engaged by the latch 11 and held in engagement thereby.

The hinged supporting member 64 is likewise provided with a boss 71 on its under-surface near the latch-engaging portion 70. The boss 71 is adapted to be engaged by the upwardly projecting boss 41 of the bent lever 38 when the latter is moved into position by the operation of the brake arm 31 through the energization of the solenoid 49 while the motor 6 is running. Consequently, the hinged supporting member 64 cannot be lowered, and the clutch jaws 69 of the sprocket 67 cannot be engaged with the clutch jaws 28 of the clutch portion 27 on the motor shaft 7 (Figures 3 and 7) while the motor is running. The sprocket 67 is engaged by the sprocket chain 72 which also passes through the sprocket guide portions 73 of the hinged supporting member 64 and hang downward so as to be within reach of the operator. Figure 1 shows the hinged supporting member 64 and its parts in a raised or disengaged position, whereas Figure 4 shows the same parts in an engaged position.

In order that the motor may not be operated while the hinged supporting member is in an engaged position (Figure 4), the shaft 62 thereof is provided with an arm 74 (Figures 1 and 2), the outer end of which engages the operating button of the switch 75. The latter is normally closed, but opens the motor circuit when the hinged supporting member 64 is pulled downward into engaging position, so that the arm 74 operates the switch 75.

The downward motion of the hinged supporting member 64 is resisted by the coil spring 76 surrounding the shaft 32 (Figures 1 and 4).

The lower end of the motor shaft 7 (Figure 1) is provided with a worm 77 which engages a worm gear 78 on the horizontal shaft 79. The latter also carries the pinion 80 meshing with the gear 81 mounted on the horizontal shaft 82. The gear 81 in turn meshes with the large gear 83 which serves to rotate the shaft 84. The shaft 84 communicates power to the closure member and opens or shuts the closure member according to the direction of rotation of the motor shaft 7 as determined by the operation of the electrical circuit hereinafter described.

The limits at which the closure shall be opened or closed are determined by a mechanically-operated limit switch 85 (Figure 8). This limit switch is provided with an "open" limit portion, generally designated 86, and a "close" limit portion, generally designated 87. The "open" switch portion 86 consists of a fixed bar 88 having a fixed contact 89, engaged by the corresponding contact 90 on the pivoted switch bar 91. The latter is mounted upon the pivot pin 92 and at its opposite end carries the adjusting screw 93. Similarly, the "close" portion consists of a fixed bar 94 having a contact point 95 adapted to engage the corresponding contact point 96 of the pivoted switch bar 97 mounted on the pivot pin 98 and having the adjusted screw 99 upon the opposite end thereof.

The limit switch 85 is actuated by the threaded shaft 100, carrying the movable nut 101 and journaled in the bosses 102 upon the base 103 of the limit switch. The threaded shaft 100 is provided with a clutch portion 104 having pins adapted to engage a corresponding clutch portion 105 on the gear shaft 82, previously described. The base 103 is provided with a bracket portion 106, by which it may be attached to the casing 1, as by the set screws 107. In the embodiment shown in Figure 1, the limit switch 85 is attached to the casing 1 on the opposite side of the mechanism from the side facing the observer—in other words, on the lefthand side of the apparatus, the righthand side of which is shown in Figure 1.

The limit switch 85 is adjusted by means of the set screws 93 so that the switch bars 91 and 97 will be moved when the closure reaches its opening and closing limits respectively. When these limits are reached, the projection 108 engages either of the set screws 93 or 99, depending upon the direction of rotation of the threaded shaft 100. The circuit is thus opened, as will be seen in the discussion of the electrical operation, and the motor halted when the closure reaches either of its extreme positions.

Figure 14:
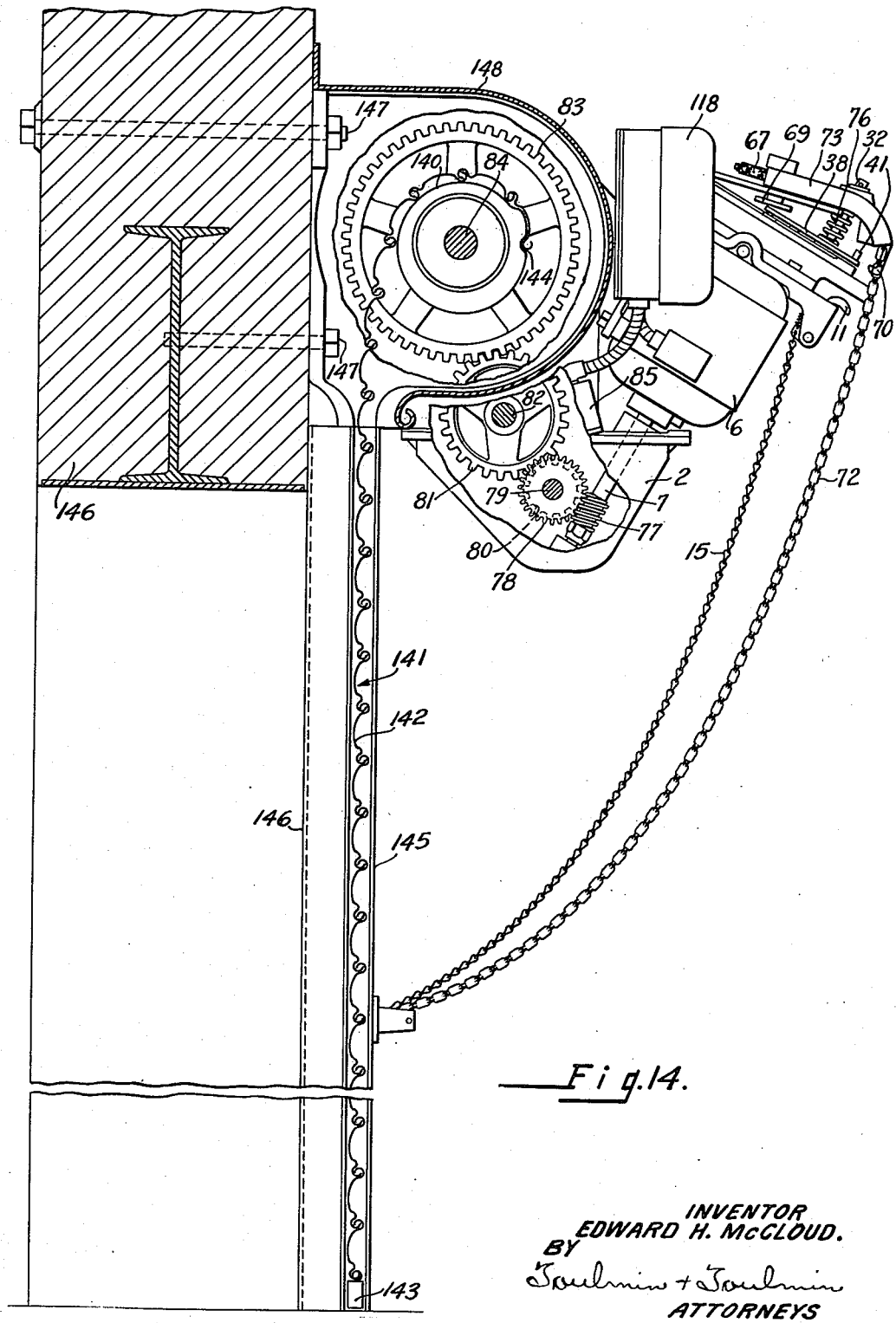
Figure 14 is a transverse vertical sectional view through a rolling door operatively connected in a conventional manner to the closure-operating device of Figure 1.

The device of my invention is likewise provided with a push button switch, generally designated 109 (Figure 9), mounted in any convenient position and serving to operate the electrical apparatus. The switch 109 is provided with individual switches 110, 111 and 112, known as the "open", "close", and "stop" switches respectively. The switches 110 and 111 serve to energize the contactor switches 113 and 114 (Figure 9). These contactor switches serve to control the motor operation in a manner subsequently to be described. The closure-operating device of my invention may be connected to a door in the conventional manner shown in Figures 1 and 14. As previously described, the shaft 84 is driven by the closure-operating device. Mounted upon this shaft 84 is a drum 140 adapted to receive a door 141 thereon, this door consisting of a plurality of articulated slats 142, having a bottom bar 143. The door 141 is anchored to the drum 140 as at 144. The door 141 is guided in its vertical ascent and descent by the channel members 145 attached to the wall 146 on each side of the door opening. The door-operating mechanism is attached to the wall 146 by means of the bolts 147, anchoring the housing 148. This housing serves not only as a protecting casing for the door-operating mechanism, but also as a support for the closure-operating device.

*Electrical circuit*

The electrical circuit for operating the device of my invention is shown in Figure 9. Power current is received from the power lines 115 and 116, a part of this being diverted to the primary winding of the transformer 117 which is bridged between them. This transformer 117 supplies low voltage control current from its secondary winding.

The electrical circuit is provided with a switch box 118 containing two contactor switches 113 and 114 having three switch bars each. The "open" contactor switch 113, when energized, serves to operate the motor 6 so that it opens the closure. The closing contactor switch 114, however, serves to operate the motor 6 in a reverse direction in order to close the closure. There is likewise provided a limit switch 85 which is mechanically operated so that its opening portion 86 is actuated to de-energize the motor when the closure reaches the limit of its opening motion; and the closing portion 87 is similarly operated to de-energize the motor 6 when the closure reaches the limit of its closing position. The mechanical operation of this limit switch 85 has already been described.

The electrical circuit shown in Figure 9 also contains the push button switch 75, the operation of which has previously been described, it being operated to open the circuit when the hinged closure member 64 is lowered into a position where the manual control mechanism becomes engaged. The circuit of Figure 9 likewise contains the solenoid 49 which, as previously described, controls the releasing of the brake bands 22 from the brake surface portions 21 of the brake drum 20 on the motor shaft 7.

*Motor-driven operation*

When it is desired to start the apparatus in a direction adapted to open the door or other closure operated thereby, the push button switch 110 is closed (Figure 9). This action closes the circuit and permits a flow of control current from the secondary winding of the transformer 117 through the winding of the contactor switch 113 by way of the open portion 86 of the limit switch 85 and by way of the push button switch 75. It will be assumed that the hinged supporting member 64 is in its raised position with the manual mechanism disengaged, so that the switch 75 is in closed circuit. The current passes from the righthand pole of the secondary winding of the transformer 107 to and through the push button switch 112 of the push button switch assembly 109 (Figure 9), the opposite side of which supplies current to the push button switches 110 and 111. The current flows through the now-closed "open" push button switch 110 to and through the "open" portion of the limit switch 85, thence to and through the operating coil of the "open" contactor switch 113, energizing it and passing onward to the lefthand side of the secondary winding of the transformer 117, completing the circuit. The contactor switch 113, thus energized, closes its three switch bars. Power current is now free to flow from the power line 113 through the motor 6 to the power line 116 by way of the upper bar of the contactor switch 113, starting the motor in a direction adapted to open the closure. At the same time, power current flows from the power line 115 through the middle bar of the contactor switch, likewise connected to the power line 116. This action energizes the solenoid 49 and releases the brake bands 22 from the brake drum 20, allowing the motor shaft 7 to rotate freely.

Finally, by closing of the lower bar of the contactor switch 113, control current is enabled to continue to flow through the operating coil of the contactor switch 113 without passing through the push button switch 110: in this manner the contactor switch 113 remains energized after the push button switch 110 is released.

The motor shaft 7 rotates, operating the mechanism until the closure reaches its "open" limit, whereupon the nut 101 on the limit switch shaft 100 opens the "open" portion 86 thereof. This de-energizes the operating coil of the "open" contactor switch 113, stopping the motor 6. The same action de-energizes the solenoid 49, so that the brake is re-applied to the motor shaft 7, locking the closure in its "open" position.

If it is now desired to operate the closure to a closed position, the "close" push button 111 is depressed. This action allows control current to flow from the righthand end of the secondary winding of the transformer 117 to and through the push button switches 75, 112 and 111 to and through the "close" portion 87 of the limit switch 85 to and through the operating coil of the "close" contactor switch 114, energizing it and continuing to the lefthand end of the secondary winding of the transformer 117, completing the circuit. This action causes the three bars of the "close" contactor switch 114 to be closed. Power current then flows from the power line 115 through the upper bar of the contactor switch 114 to and through the motor 6 in a reverse direction. The closing of the middle bar of the contactor switch 114 allows power current to flow from the power line 115 to and through the brake-releasing solenoid 49 to the power line 116, causing the brake to be released from the motor shaft 7 and allowing the latter to rotate freely. The closing of the lower bar of the contactor switch 114 permits control current to continue to flow through the operating coil of the "close" contactor switch 114 without passing through the "close" push button switch 111, thus permitting the contactor switch 114 to remain energized even after the push button switch 111 is released.

The motor 6 rotates and operates the mechanism until the nut 101 of the limit switch 85 engages the switch bar 97 of the "close" portion, opening the circuit and de-energizing the operating coil of the contactor switch 114. The switch bars thereof fly open, causing the motor 6 to stop and the brake to be applied to the shaft 7 thereof. This locks the closure in its closed position.

If it is desired to stop the operation at any intermediate point, thus leaving the closure in a partly open position, the "stop" push button switch 112 of the push button switch assembly 109 (Figure 9) is depressed. This opens the circuit in the control current line, running thereto from the righthand pole of the secondary winding of the transformer 117 by way of the push button switch 75. This action de-energizes the operating coils of either of the contact switches 113 or 114, which happens to be energized at the moment, stopping the motor 6 and applying the brake to the shaft 7 thereof.

*Manual operation*

When it is desired to operate the closure mechanism by hand, the chain 72 is pulled downward in such a manner as to cause the hinged supporting member 64 and its clutch portion 69 to become inter-engaged with the clutch portions 28 on the motor shaft 7. The latch-engaging portion 70 is then held by the latch member 11, so that the parts are maintained in engagement. The same action causes the latch-engaging portion 70, which is of wedge-shaped form (Figure 5) to engage and push apart the beveled portions 53 on the ends of the brake arms 23 and 24, releasing the brake from engagement with the motor shaft 7, and allowing the latter to be rotated freely. By pulling one side or the other of the chain 72, the sprocket 67 may be rotated, thereby rotating the motor shaft 7 and operating the mechanism to open or close the door or other closure. When it is desired to release the manual mechanism, the chain 15 is pulled downward by means of the handle 14, disengaging the latch-member 11 and allowing the hinged supporting member 64 to be pushed upward out of engagement under the action of the coil spring 76 (Figure 4).

While the manual mechanism is engaged with the motor shaft 7, it is impossible to accidentally operate the motor 6 because the push button switch 75 is opened under the action of the arm 74 attached to the shaft 62 on which is mounted the hinged supporting member 64 (Figure 1). Only when the latter is raised and the manual mechanism disengaged, is the circuit again closed through the push button switch 75.

If the motor 6 is already operating, it is impossible to accidentally engage the manual mechanism by pulling downward on the chain 72, because the brake-operating arm 37 has moved the bent lever 38 (Figure 3) and the upwardly projecting boss 41 into such a position as to engage the corresponding portion 71 on the hinged supporting member 64, preventing it from being closed.

*Modified form of closure-operating device*

Figure 12:
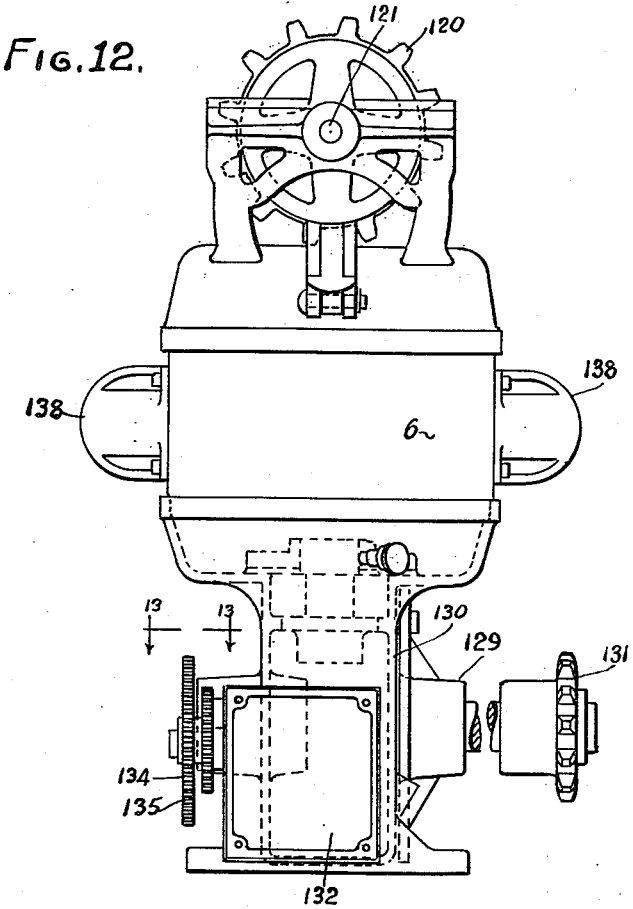
Figure 12 is a front elevation of the modified device shown in Figure 10.

In the modified form of closure-operating device shown in Figures 10 to 12 inclusive, the construction and operation are generally similar to that of the preferred embodiment already described, and similar numerals are used to designate similar elements. In the modified form, however, the manually-operated sprocket 120 is mounted upon the shaft 121 carried by the hinged supporting member 122, and bears upon its opposite end the beveled pinion 123. The coil spring 124 serves to urge the hinged supporting member 122 upward into its disengaged position.

The motor shaft 7 is provided at its upper end with a bevel pinion 125 adapted to engage and intermesh with the bevel pinion 123 when the hinged supporting member 122 is in its downward position. In the latter position the member is locked in place by the latch-member 11 of the same construction as that previously described.

The safety devices for preventing the operation of the motor while the manual mechanism is engaged and vice versa are of substantially the same construction and operation as previously described. The brake on the motor shaft 7 is also of a similar construction and is operated in a similar manner.

The lower end of the motor shaft 7 is provided with the worm 126 which meshes with a worm gear 127 mounted upon the closure-operating shaft 128 (Figure 11). The latter is journaled in the boss 129, projecting from the casing 130, and on its outer end carries the sprocket 131, by which the closure is operated.

Figure 13:
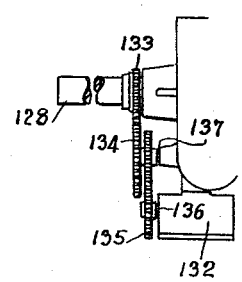
Figure 13 is a plan view, taken in the direction of the line 13—13 of Figure 12, and showing the mechanism for operating the limit switch in the modified form of my invention shown in Figures 10 to 12.

The limit switch 132 of the modified apparatus shown in Figures 10 to 12 inclusive is operated by a train of gearing. The closure-operating shaft 128 carries a pinion 133 which meshes with one portion of the double gear 134, the other portion of which meshes with the pinion 135 mounted upon the shaft 136 of the limit-switch 132. The double gear 134 is mounted for free rotation upon the shaft 137 (Figure 13).

The limit switch 132 is so adjusted that one element thereof will be disconnected and a circuit broken when the shaft 128 rotates a predetermined number of revolutions in one direction; whereas a similar opening of the circuit takes place when the shaft 128 rotates a predetermined number of revolutions in the opposite direction. The setting of the switch 132 corresponds to the limits of opening and closing of the closure.

In the modified form of apparatus, power is communicated to the motor by wiring passing through the motor terminal box 138 (Figure 12), which may be located on either side of the motor, according to the convenience governed by the installation conditions.

In the preferred modifications shown, the safety devices for preventing the engagement of the manual mechanism have been operated by the solenoid 49 which is energized while the motor 6 is running. It will be understood, however, that a mechanically-operated type of safety device might also be used to accomplish this same purpose. For example, the motor shaft 7 or the parts operatively connected thereto may be provided with a motion-operated device, such as a governor. The latter, under the influence of centrifugal force generated in the operation of the motor, becomes operative and moves its control rod, this in turn serving to interpose the boss 41 and prevent the closing of the manual mechanism.

The brake on the motor shaft may obviously be released by the same action which closes the motor switch, in a mechanical manner, as distinguished from the electrical means previously described. The motor switch, for example, may be provided with a lever which serves not only to close the switch but also at the same time to release the brake through appropriate intermediate mechanism such as links, racks or gearing.

It will be understood that I desire to comprehend within my invention such modifications as may be necessary to adapt it to varying conditions and uses.

Having thus fully described my invention, what I claim as new and desire to secure by Letters Patent is:

1. A closure-operating device comprising a power-driven closure-operating mechanism, manually-actuated closure-operating mechanism, means for operatively engaging said mechanisms selectively, normally engaged braking means therefor, means responsive to the operation of said power-driven closure-operating mechanism to disengage said braking means, means responsive to the utilization of said manually-actuated closure-operating mechanism to disengage said braking means, and lock-out means operated by said power-responsive brake-disengaging means for positively locking said normally-actuated closure-operating mechanism out of operability when said braking means is disengaged and said power-operated mechanism is in operation.

2. In combination, a power-driven mechanism, manually-actuated mechanism, means for operatively engaging said mechanisms selectively for drive of said power driven mechanism by said manually actuated mechanism, normally engaged braking means therefor, means responsive to the operation of said power-driven mechanism to disengage said braking means, means responsive to the utilization of said manually-actuated mechanism to disengage said braking means, a lock-out member for positively locking said manually-actuated mechanism out of operability, and means responsive to the operation of said power-operated mechanism for operating said lock-out member during operation of said power operated mechanism.

3. In combination, power driven mechanism, manually actuated mechanism, means for engaging said mechanisms selectively, normally engaged braking means therefor, means responsive to the operation of said power driven mechanism to disengage said braking means, means responsive to the utilization of said manually actuated mechanism to disengage said braking means, and lockout means operated by said power responsive brake disengaging means for positively locking said manually actuated mechanism out of operability when said braking means is disengaged and said power driven mechanism is in operation.

4. In combination, power driven mechanism, manually actuated mechanism, means for engaging said mechanisms selectively for manual operation of said power driven mechanism by said manually actuated mechanism, normally engaged braking means therefor, means responsive to the operation of said power driven mechanism to disengage said braking means, means responsive to the utilization of said manually actuated mechanism to disengage said braking means, and lockout means operated by said power responsive brake disengaging means for positively locking said manually actuated mechanism out of operability when said braking means is disengaged and said power driven mechanism is in operation.

5. In combination, power driven mechanism, manually actuated mechanism, means for engaging said mechanisms selectively, normally engaged braking means for said power driven mechanism, means responsive to the operation of said power driven mechanism to disengage said braking means, means responsive to the utilization of said manually actuated mechanism to disengage said braking means from said power driven mechanism, and lockout means operated by said power responsive brake disengaging means for positively locking said manually actuated mechanism out of operability when said braking means is disengaged from said power driven mechanism and said power driven mechanism is in operation.

6. In combination, power driven mechanism, manually actuated mechanism, means for engaging said mechanisms for driving said power driven mechanism by said manually actuated mechanism, normally engaged braking means for said power driven mechanism, means responsive to the operation of said power driven mechanism for disengaging said braking means therefrom, means responsive to the utilization of said manually actuated mechanism for disengaging said braking means from said power driven mechanism, and lockout means operated by said power responsive brake disengaging means for positively locking said manually actuated mechanism out of operability when said braking means is disengaged from said power driven mechanism and said power driven mechanism is in operation.

EDWARD H. McCLOUD.